(No Model.)

G. T. HUNSAKER.
Method of Sealing Fruit Cans.

No. 235,879. Patented Dec. 28, 1880.

Witnesses:
A. McCory.
Alex Porter Morse

George T. Hunsaker, Inventor:
By Paine, Crafton & Ladd,
Attorneys.

UNITED STATES PATENT OFFICE.

GEORGE T. HUNSAKER, OF CARTHAGE, ILLINOIS.

METHOD OF SEALING FRUIT-CANS.

SPECIFICATION forming part of Letters Patent No. 235,879, dated December 28, 1880.

Application filed September 17, 1880. (No model.)

*To all whom it may concern:*

Be it known that I, GEORGE T. HUNSAKER, a citizen of the United States, residing at Carthage, in the county of Hancock and State of Illinois, have invented certain new and useful Improvements in Methods of Sealing Fruit-Cans; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.
The object of the present invention is to provide a simple, convenient, and effectual method of sealing fruit cans and jars, or, in other words, securing the covers of the cans or jars in an air-tight manner without requiring the use of soldering implements or wax or cement held in vessels in a melted state.

The invention consists in sealing a can or jar by means of a cord or strip coated with a cement or sealing composition and seated in an external groove or depression located at the junction of the can or jar and the top or cover thereof. The heat from the contents of the can or jar will serve to melt the sealing composition so as to cause it to spread and run around the edge of the top or cover and hermetically seal the same after it has hardened. For unsealing the can or jar to remove the cover or top, the sealing-cord is bodily torn from its seat by simply grasping some portion thereof and stripping it off.

Figure 1:
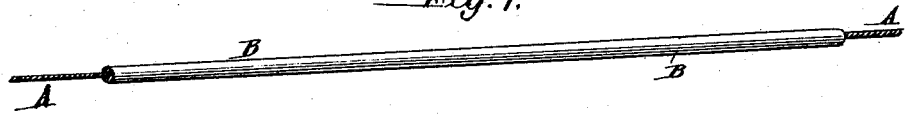
Figure 2:
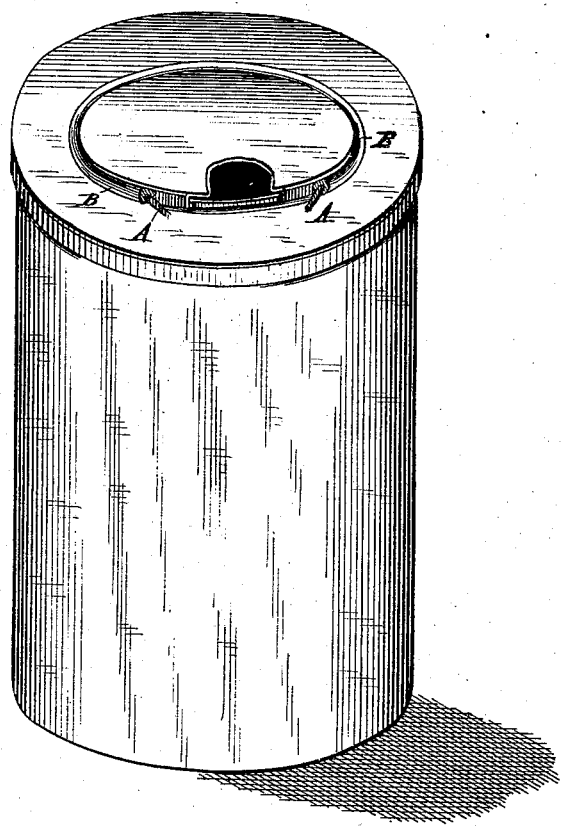
Figure 3:
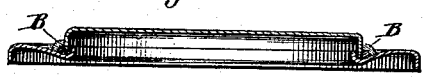

In the accompanying drawings, Figure 1 shows a flexible or pliable sealing-strip for carrying out my invention. Fig. 2 shows a fruit-can with the cover sealed by means of a flexible sealing-strip. Fig. 3 is a sectional view of a can-top and a body portion having a depression with a sealing-cord placed therein.

It is undoubtedly a matter of great importance, in putting up fruit and other articles in cans and jars, to have a device for sealing the latter in a simple and expeditious manner. The common method is to perform the sealing operation by pouring melted wax into the so-called "sealing-groove" of a fruit-can after the same has been filled and the cover has been applied. It necessarily follows that the handling of a vessel of melted wax is objectionable or undesirable for obvious reasons. According to another method pursued for sealing cans, a piece of wire-solder is melted by a soldering-implement, which is also objectionable. It has also been proposed to seal jars by placing a cement or wax covered strip or cord in a groove or seat formed in the body of a jar and then applying the cover or top so as to bear upon and cover said sealing-strip.

As shown in the drawings, I make use of a sealing-strip consisting of a flexible core, A, and a covering, B, of wax or any other suitable sealing composition possessing the property of not being too brittle. The composition generally employed is wax and resin, which is applied to the flexible core in the manner stated.

The flexible core A is made of a hempen or other textile string, or a strip of leather or flexible wood, and even a metallic wire may serve the function, which is to enable the sealing-strip, by reason of the presence of a flexible core, to be coiled or bent without breaking and detaching the sealing composition. As shown in Fig. 2, the flexible sealing-strip is coiled in the customary groove or depression formed in a fruit can or jar top for the purpose of receiving composition or solder.

It will be obvious that by placing the flexible sealing-strip in position while the can or jar is still hot—*i. e.*, after the fruit has been placed therein—the heat of the prepared fruit will be sufficient to melt the composition and cause it to spread evenly in the sealing-groove of said cover or jar. It necessarily follows that after the jar or can has become cool the sealing composition will harden, and thus serve to firmly secure the cover in position and hermetically seal it. The flexible core, in addition to its legitimate function of rendering the sealing composition ductile or pliable, will also enable the can or jar to be readily unsealed, because by raising and catching hold of one portion of the strip it may be torn from the sealing-groove.

Having thus described my invention, what I claim as new, and desire to secure by Letters Patent, is—

The method of sealing fruit cans and jars herein described, which consists in seating a cement-coated cord or strip adjacent to or in contact with the edge or outer flange of a top or cover after the latter has been applied to a heated can or jar, and then hardening the wax by cooling, whereby the cement is spread by the heat of the can or jar, and subsequently hardened to firmly retain the cover, and left in such a state that it can readily be removed to permit the cover to be detached, as and for the purpose set forth.

In testimony whereof I affix my signature in presence of two witnesses.

GEORGE TROUTMAN HUNSAKER.

Witnesses:
E. M. ROBBINS,
E. W. MOORE.